Patented Jan. 3, 1928.

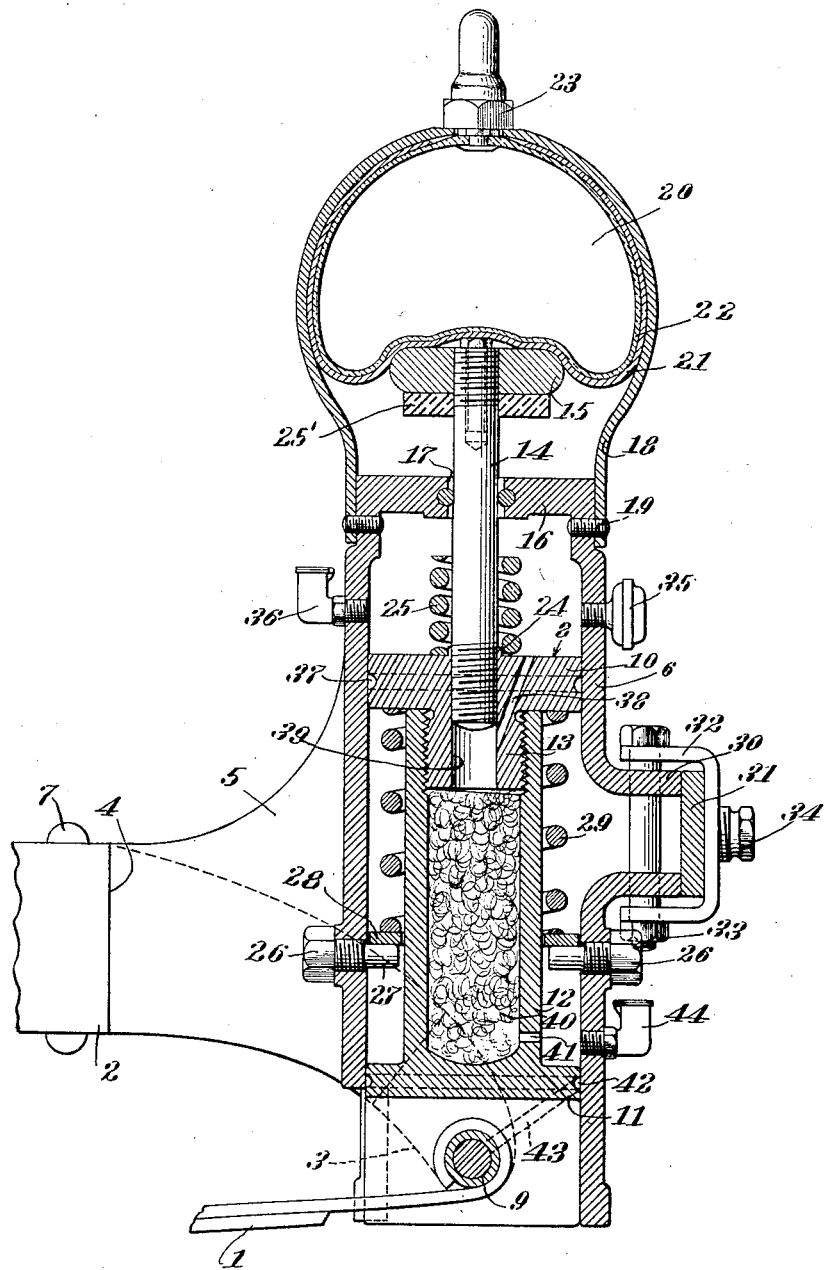

1,655,208

UNITED STATES PATENT OFFICE.

JOHN A. STEVENS, OF LOWELL, MASSACHUSETTS, ASSIGNOR TO STEVENS PRODUCTS COMPANY, OF LOWELL, MASSACHUSETTS, A CORPORATION OF DELAWARE.

SHOCK ABSORBER.

Application filed September 9, 1926. Serial No. 134,406.

This invention relates to shock absorbers and more particularly to devices for absorbing shocks caused by the quick relative movement of two members. One specific application of the invention is a device intended for use in connection with vehicles to absorb the shocks caused by the unevenness of the road and while the invention is not limited to this use, it has many advantages which make it particularly adapted thereto.

At the present time automobiles and other vehicles are provided with springs which absorb the lighter shocks so that the occupants thereof are subjected to shocks only of the greatest intensity, which are softened and partially absorbed, so that a rolling or oscillatory motion is all that is normally transmitted to them. However, when traveling at high speeds or over rough roads, and in any case when traveling long distances, even this motion becomes disagreeable and in some instances is the cause of an illness similar to seasickness. It is one of the objects of this invention to counteract this disagreeable motion both by cushioning the initial shock and by slowing up or dampening the rebound or recoil therefrom. This second action is especially important in the case of automobiles equipped with balloon tires, which themselves act as shock absorbers, but do not slow up the rebound, which results in the undulating or oscillating motion above described. This invention is designed to overcome these difficulties. A further object of the invention is to provide a device which may be easily assembled from comparatively simple inexpensively made parts and which may be used for a long period of time with little or no care. For this purpose the invention concerns itself to a great extent with the means for adequately lubricating the bearing surfaces of the device in such a way that actual introduction of lubrication material need only be made at very infrequent intervals, provision being made for retaining the material within the device and feeding it as fast as may be necessary to the parts where friction might occur. Other objects and advantages of the invention will be apparent from a reading of the sub-joined description and claims taken in connection with the accompanying drawings in which the single figure is a view of the device substantially in vertical section.

The numeral 1 designates the usual semi-elliptical leaf spring mounted on the axis of a vehicle and adapted normally to support the usual chassis or frame 2 by a connection shown in broken lines at 3. When the device embodying this invention is introduced between springs 1 and the chassis or frame 2, the bracket at the end of the frame 2 is cut off preferably on the line 4, and a special bracket 5 which may be integral with the body 6 of the device may be attached to the frame 2 by rivets 7 or other desired fastening means.

A piston generally indicated at 8 may be pivotally connected to the springs 1 at 9 and provided with upper and lower bearing portions 10 and 11 respectively, the lower bearing portion 11 being provided with an elongated hollow sleeve 12 having its end internally screw threaded for the reception of a boss 13 which may be integral with the upper bearing portion 10. A piston rod 14 is threaded into an opening in the bearing portion 10 and may be provided at its upper end with a head 15 for a purpose later to be described. The upper end of the casing 6 may be provided with an inturned diaphragm portion 16 having an aperture 17 at its center for the passage of the piston rod 14; the aperture 17 may be provided with an annular groove in which may be placed a fibrous or metallic packing, here shown in cylindrical form, for the purpose of preventing oil, grease or other materials from passing above the diaphragm 16. A dome 18 may be connected with the top of the casing 6 in any suitable manner, for example by a plurality of peripherally spaced stud screws 19. This dome forms a compression chamber 20 and has therein a jacket or carcass 21 of rubberized canvas or other suitable material having therein a ball 22 preferably of rubber which may be inflated through a valved opening 23 provided with a valve of the type ordinarily used in connection with pneumatic casings. The piston head 15 is adapted to bear against the lower portion of the carcass 21 so that compressible fluid such as air within the ball is further compressed on movement of the piston 8 in an upward direction.

The bearing portion 10 is provided with an outwardly flaring flange portion 24 which is adapted to receive and retain the endmost turn of a helical spring 25 which normally terminates short of the diaphragm. Spring 25 is adapted to assist in supporting a heavy superimposed load which may be placed in the vehicle to which the device is attached, and in any case is called into action upon an extremely heavy shock to act in tandem with the compression chamber in opposing movement of the piston in an upward direction.

A buffer 25' preferably of rubber is provided below the piston head 15 for the purpose of resiliently cushioning and stopping the downward movement of the piston after a predetermined movement by contacting with the diaphragm member 15.

The casing 6 is provided with a plurality of peripherally spaced bolts 26 having reduced portions 27 at their inner ends which are adapted to support an annular ring 28. A spring 29 extends between the ring 28 and the under part of the bearing portion 10, which spring is effective to absorb the recoil from the initial shock or movement of the piston in a downward direction.

The casing may be provided at its forward portion with an extension 30 adapted to support a bumper 31 extending between two shock absorbers attached to the front or rear of a vehicle, which bumper may be attached by a yoke portion 32 held to the extension 30 by a nut and bolt 33, the bumper being forced against the extension 30 by means of a stud screw 34 threaded in the yoke portion 32.

If desired a breather 35 may be inserted in the casing 6 between the normal position of the bearing portion 10 and the diaphragm 16.

Lubricating means are provided in connection with the device comprising an oil cup 36 screwed into a passage in the wall of the casing 6 between the diaphragm 16 and the normal position of the bearing portion 10 or other lubricating material hereinafter referred to as oil entering from the cup 36 will be distributed about the top of the bearing portion 10 and will pass between this portion and the wall of the casing 6 into the annular groove 37 in this bearing portion, which groove will redistribute it substantially equally about the periphery of the bearing. A passage 38 is provided between the space above the bearing portion 10 and a bore 39 within the stud 13, in turn communicating with the hollow portion within the sleeve member 12. This hollow portion is preferably filled with some fibrous absorbent material indicated at 40 so that oil from above the bearing portion 10 will be conducted through the passage 38 and bore 39 into the material 40 which will be saturated therewith. A passage 41 is provided inside the sleeve member 12 extending from the hollow space to the annular space surrounding said sleeve member above the bearing portion 11. The oil will then be distributed about this bearing, thence into the annular groove 42 where a portion will be redistributed to lubricate the lower part of the bearing and the remainder conducted through a passage 43 to the bearing 9, whereby all of the bearings of the device will be lubricated by the introduction of oil into oil cup 36. If desired an additional oil cup 44 may be provided in the side of the casing 6 for the introduction of oil between bearing portions 10 and 11.

It will be seen that I have provided a shock absorber which will absorb the initial shocks, provide additional resistance to extremely heavy shocks or additional supporting means for heavy superimposed loads on the device and will cushion the recoil. At the same time I have provided a device which is comparatively simple to construct and which is provided with lubricating means effective properly to lubricate the device even though oil is introduced at infrequent intervals. I do not wish to be limited, therefore, except by the scope of the appended claims as many slight changes and modifications in the device may be made.

I claim:

1. A device for absorbing the shock caused by the quick relative movement of two members comprising a casing fixed to one of said members, a piston operatively connected to the other of said members having a sliding contact within said casing, a collapsible pneumatic jacket within said casing connected to said piston and adapted to be compressed or expanded with relative movements of said members and a single opening for the insertion of lubricating material for all the relatively moving bearing surfaces of the device.

2. A device for absorbing the shock caused by the quick relative movement of two members comprising a casing fixed to one of said members, a piston operatively connected to the other of said members having a sliding contact within said casing, a collapsible pneumatic jacket within said casing connected to said piston and adapted to be compressed or expanded with relative movements of said members and means for lubricating all the relatively moving contacting surfaces in the device comprising an oil opening adjacent to the top of said casing and passages in the piston for distributing the oil to the bearing surfaces.

3. A device for absorbing the shock caused by the quick relative movement of two members comprising a casing fixed to one of said members, a collapsible pneumatic jacket within said casing, a piston connected to said jacket and operatively connected to the other of said members, said piston having a sliding contact within said casing, an oil inlet opening above the piston, whereby oil inserted therethrough will lubricate the contacting surfaces of the piston and casing, and a passage from above the piston to its connection with said other member for leading oil to that connection.

4. A device for absorbing the shock caused by the quick relative movement of two members comprising a casing fixed to one of said members, a collapsible pneumatic jacket within said casing, a piston connected to said jacket and operatively connected to the other of said members, said piston having a sliding contact within said casing, an opening in the casing above the piston for the insertion of a lubricant, a hollow portion in the piston adapted to retain a quantity of lubricating material, and passages leading from above the piston to said hollow portion and thence to all of the relatively movable contacting surfaces of the device.

5. A device for absorbing the shock caused by the quick relative movement of two members comprising a casing fixed to one of said members, a piston operatively connected to the other of said members having a sliding contact within said casing, said piston having two enlarged portions bearing against the inside of the casing, a constricted hollow portion substantially filled with fibrous material between said enlarged portions, means on the outside of said casing for introducing oil into the device to lubricate the upper bearing portion, a passage communicating between the hollow portion and the space above the upper bearing portion whereby the fibrous material may be saturated with oil, and means for permitting the oil from the fibrous material gradually to flow to the lower bearing portion and to the connection between said piston and said other member.

6. A device for absorbing the shock caused by the quick relative movement of two members comprising a casing fixed to one of said members, a piston operatively connected to the other of said members having a part bearing against the inside of said casing, a compression chamber within said casing filled with a compressible fluid, said piston having a hollow portion for the reception of lubricating material, a passage from said hollow portion to one of the bearings of the device, an abutment on said casing and a spring surrounding the hollow portion extending between said abutment and a shoulder on said piston, said compression chamber opposing movement of said piston in one direction and said spring opposing movement of said piston in the opposite direction.

7. A device for absorbing the shock caused by the quick relative movement of two members comprising a casing fixed to one of said members having a cylindrical chamber therein, a piston operatively connected to the other of said members, said piston having a plurality of spaced bearing portions thereon adapted to slide within said cylindrical chamber, a compression chamber adjacent to one end of said cylindrical chamber filled with a compressible fluid and having a flexible wall, said piston having a head bearing against said wall, whereby movement of said piston in one direction is opposed by increased pressure of the fluid within said compression chamber.

8. A device for absorbing the shock caused by the quick relative movement of two members comprising a casing fixed to one of said members having a cylindrical chamber therein, a piston operatively connected to the other of said members, said piston having a plurality of spaced bearing portions thereon adapted to slide within said cylindrical chamber, a compression chamber adjacent to one end of said cylindrical chamber filled with a compressible fluid and having a flexible wall, said piston having a head engaging said wall, an abutment on said casing, and a spring surrounding the piston between two of said bearing portions and extending from one of them to said abutment, said compression chamber opposing movement of said piston in one direction and said spring opposing movement of said piston in the opposite direction.

9. A device for absorbing the shock caused by the quick relative movement of two members comprising a casing fixed to one of said members having a cylindrical chamber therein, a piston operatively connected to the other of said members, said piston having a plurality of spaced bearing portions thereon adapted to slide within said cylindrical chamber, a compression chamber adjacent to one end of said cylindrical chamber filled with a compressible fluid and having a flexible wall, said piston having a head bearing against said wall, an abutment on said casing between said bearing portions and said piston, a spring surrounding the piston having one end fixed to the endmost bearing portion and the other end terminating short of said abutment, said spring adapted only on an extremely heavy shock to act in tandem with said compression chamber to oppose movement of said piston in one direction.

10. A device for absorbing the shock caused by the quick relative movement of two members comprising a casing fixed to one of said members having a cylindrical chamber therein, a piston operatively connected to the other of said members, said piston having a plurality of spaced bearing portions thereon adapted to slide within said cylindrical chamber, a compression chamber adjacent to one end of said cylindrical chamber filled with a compressible fluid and having a flexible wall, said piston having a head bearing against said wall, an abutment on said casing between said bearing portions and said piston, a spring surrounding the piston having one end fixed to the endmost bearing portion and the other end terminating short of said abutment, said spring adapted only on an extremely heavy shock to act in tandem with said compression chamber to oppose movement of said piston in one direction, a second abutment on said casing, and a spring surrounding the piston between two of said bearing portions and extending from one of them to said second abutment, the last mentioned spring opposing movement of the piston in the opposite direction.

11. A device for absorbing the shock caused by the quick relative movement of two members comprising a casing fixed to one of said members having a cylindrical chamber therein, a sectional piston directly connected to the other of said members, one section of said piston being hollow, cylindrical bearing portions on said piston on either side of said hollow portion, a compression chamber adjacent to one end of said cylindrical chamber, said compression chamber being filled with a compressible fluid, a diaphragm separating said compression chamber from said cylindrical chamber having an aperture therein for the passage of the piston, and means in said aperture to prevent the upward passage of oil and other material.

12. A device for absorbing the shock caused by the quick relative movement of two members comprising a casing fixed to one of said members having a cylindrical chamber therein, a sectional piston directly connected to the other of said members, one section of said piston being hollow, cylindrical bearing portions on said piston on either side of said hollow portion, a compression chamber adjacent to one end of said cylindrical chamber, said compression chamber being filled with a compressible fluid, a diaphragm separating said compression chamber from said cylindrical chamber having an aperture therein for the passage of the piston, means for admitting lubricating material to the space between the upper bearing portion and said diaphragm, whereby to lubricate the upper bearing portion, a passage from said space to within said hollow piston, passages from within said hollow piston to the lower bearing portion and thence to the connection between said piston and said other member, whereby all the bearings of the device may be simultaneously lubricated, and means to prevent the lubricating material from passing to said compression chamber.

Signed by me at Lowell, Massachusetts, this 30 day of August, 1926.

JOHN A. STEVENS.